United States Patent

Shoji et al.

Patent Number: 5,766,504
Date of Patent: Jun. 16, 1998

[54] ABSORBENT COMPOSITION FOR AN ABSORPTION REFRIGERATION SYSTEM

[75] Inventors: Takatoshi Shoji, Kobe; Yoshiaki Takatani, Miki; Akihiro Murakami, Akashi; Kunihiko Nakajima, Otsu, all of Japan

[73] Assignees: Kawasaki Jukogyo Kabushiki Kaisha, Kobe; Kawasaki Thermal Engineering Co., Ltd., Kusatsu, both of Japan

[21] Appl. No.: 671,239

[22] Filed: Jun. 27, 1996

[30] Foreign Application Priority Data

Jun. 30, 1995 [JP] Japan ............................ 7-187791

[51] Int. Cl.$^6$ ............................................. C09K 5/04
[52] U.S. Cl. ............................ 252/69; 252/67; 62/112
[58] Field of Search ........................ 252/69, 67; 62/112

[56] References Cited

U.S. PATENT DOCUMENTS

| | | | |
|---|---|---|---|
| 3,004,919 | 10/1961 | Rush et al. | 252/67 |
| 3,541,013 | 11/1970 | Macriss et al. | 252/69 |
| 3,609,086 | 9/1971 | Modahl | 252/67 |
| 3,968,045 | 7/1976 | Sibley | 252/69 |
| 4,652,279 | 3/1987 | Erickson | 55/32 |
| 4,857,222 | 8/1989 | Itoh et al. | 252/69 |
| 4,912,934 | 4/1990 | Itoh et al. | 62/112 |

FOREIGN PATENT DOCUMENTS

| | | |
|---|---|---|
| A 2-505861 | 5/1982 | France . |
| 63-187073 | 8/1988 | Japan . |
| 2-147689 | 6/1990 | Japan . |
| 2-296888 | 12/1990 | Japan . |
| 5-228327 | 9/1993 | Japan . |
| A-5-228327 | 9/1993 | Japan . |
| A-6-25339 | 4/1994 | Japan . |
| A 6-192649 | 7/1994 | Japan . |
| 1058991 | 12/1983 | Russian Federation . |

OTHER PUBLICATIONS

Database WPI, Derwent Publications Ltd., London GB; AN 84-199945, Dec. 1983.

Database Inspec.; Institute of Electrical Engineers, Stevenage, GB; Inspec. No. AN 4983520, "Rotary Heat Pump Driven by Natural Gas", Riffat et al, Aug. 1995.

Koseki and Takahashi: "Mechanism of Solubility Elevation in Aqueous Mixed Solutions of LiBr and $CaCl_2$—Development of LiBr–$CaCl_2$ Mixture Absrobent" Kagaku Kogaku Ronbunshu 17, (1991), p. 287 no month available.

Koseki and Takahashi: "Mechanism of Vapor Pressure Depression in Aqueous Mixed Solution of LiBr and $CaCl_2$," Kabaku Kogakku Ronbunshu 17, pp. 1102–1103.

Primary Examiner—Christine Skane
Attorney, Agent, or Firm—Oliff & Berridge, PLC

[57] ABSTRACT

In order to depress a crystallization temperature of an absorbent composition for an absorption refrigeration system without depressing vapor absorption ability, cesium chloride is added to an alkaline solution containing lithium bromide as a main component, in an amount of 0.01 to 15% by weight, based on the weight of an aqueous 64% lithium bromide solution.

7 Claims, 6 Drawing Sheets

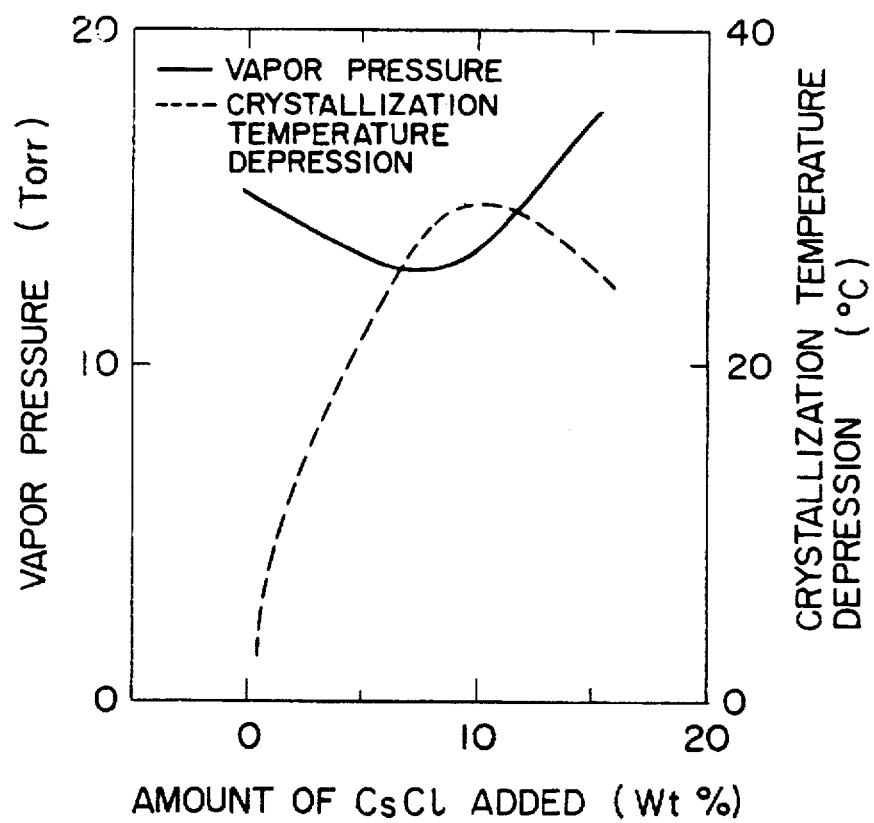
F I G. 1

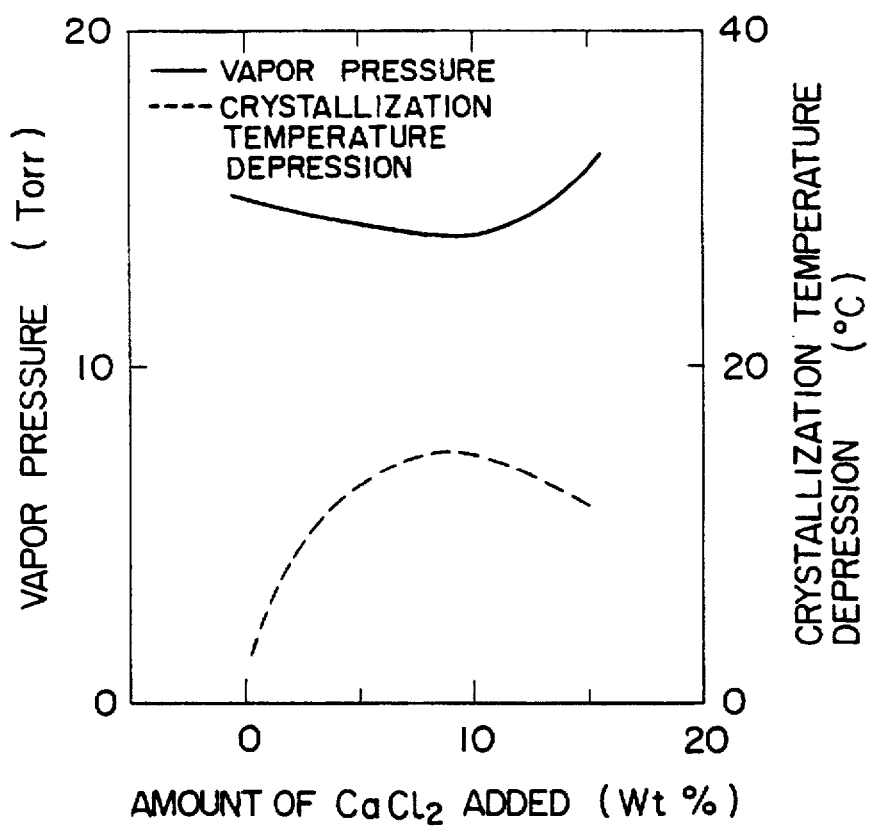
F I G. 2

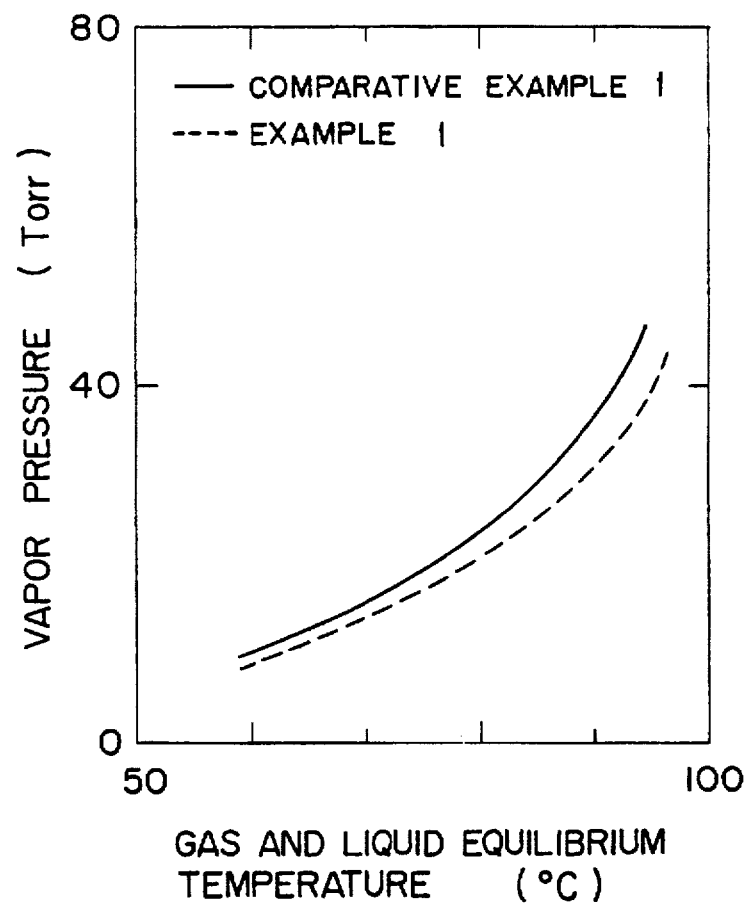
F I G. 3

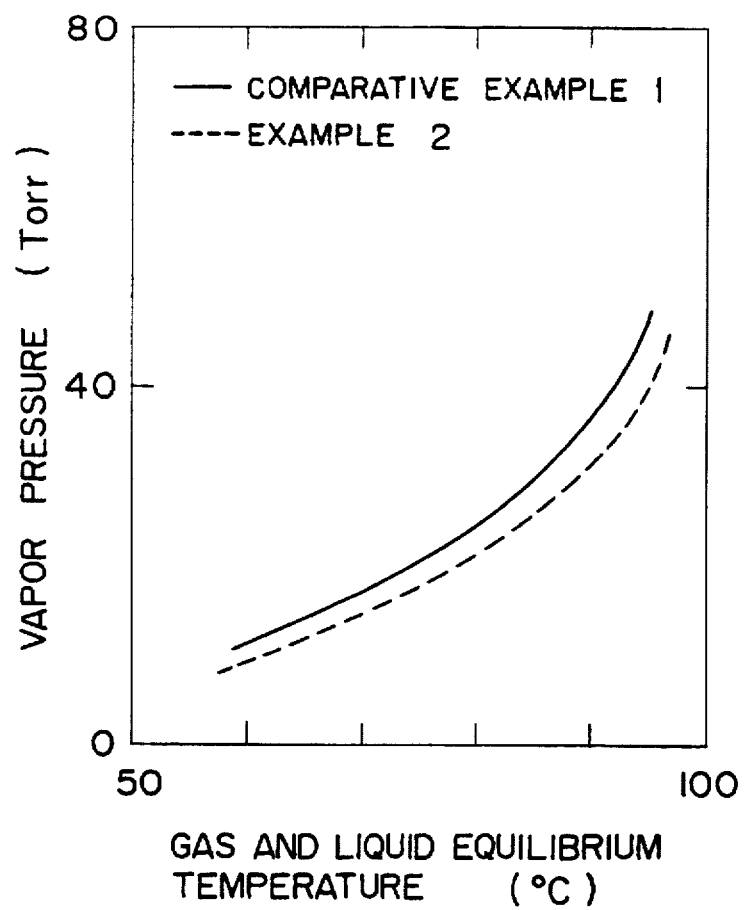
F I G. 4

ABSORBENT COMPOSITION FOR AN ABSORPTION REFRIGERATION SYSTEM

FIELD OF THE INVENTION

The present invention relates to an absorbent solution used for an absorption refrigerator or an absorption cool- or hot-water apparatus, particularly to an absorbent solution for an absorption refrigerator or an absorbent solution for an absorption cool- or hot-water apparatus (these solutions are hereinunder generally referred to as "an absorbent solution for an absorption refrigerator") in which a crystallization temperature of an absorbent solution can be lowered without depressing a vapor absorption ability of the absorbent solution by adding a certain additive as one component of the absorbent solution.

BACKGROUND

Conventionally, in an absorption refrigerator, an aqueous LiBr solution has been used as an absorbent solution. The concentration of LiBr in the absorbent solution generally used, however, is high as 60 to 65% by weight and a temperature of the solution is 60° C. or less and therefore a crystallization is locally caused at the time of midsummer when a refrigeration load is high or at the time of emergency service interruption, leading to a danger of causing malfunction.

This can be appropriately dealt with in the case that an expert operator is attended such as in a large scaled building air conditioner or in the case that an emergency power source is provided. In the case of a small scaled apparatus such as in business use or domestic use, however, there may be brought about a large problem and in an operation of the current concentration of the absorbent solution. Thus, it has been desired to develop an absorbent solution for preventing crystallization.

Japanese Patent Laid-Open Publication No. 192649/1994 discloses an absorbent solution for an absorption refrigerator in which 2 to 8% by weight of triethylene glycol or tetraethylene glycol is added to an aqueous solution of lithium bromide thereby depressing a critical temperature of crystallization.

Further, as the conventional art, (1) Koseki and Takahashi: "Mechanism of Solubility Elevation in Aqueous Mixed Solutions of LiBr and CaCl$_2$-Development of LiBr–CaCl$_2$ mixture absorbent" Kagaku Kogaku Ronbunshu" 17, pages 281 to 287 (1991)(hereinunder referred to as "Literature 1") and (2) Koseki and Takahashi: "Mechanism of Vapor Pressure Depression in Aqueous Mixed Solutions of LiBr and CaCl$_2$", Kagaku Kogaku Ronbunshu" 17, pages 1096 to 1103 (1991)(hereinunder referred to as "Literature 2") have been known.

Of these literatures, in Literature 1, CaCl$_2$ is added in the range of a value exceeding 0 to 0.67 of a ratio by weight of CaCl$_2$ to (LiBr+CaCl$_2$) thereby noting that solubility can be elevated, particularly that a ratio by weight of CaCl$_2$ to (LiBr+CaCl$_2$) has the maximum value at 0.33. Further, in Literature 2, in view of the fact that an aqueous solution in which a ratio by weight of CaCl$_2$ to (LiBr+CaCl$_2$) is 0.33 exhibits a vapor pressure equivalent to that of an aqueous solution without adding CaCl$_2$, it is shown that a crystallization prevention effect is exhibited.

BRIEF DESCRIPTION OF DRAWINGS

In the drawings, FIG. 1 is a graph for showing a relationship between an amount of CsCl added as a crystallization preventing agent and a vapor pressure and a relationship between an amount of CsCl and a crystallization temperature depression.

FIG. 2 is a graph for showing a relationship between an amount of CaCl$_2$ added as a crystallization preventing agent and a vapor pressure and a relationship between an amount of CaCl$_2$ and a crystallization temperature depression.

FIG. 3 is a graph for showing the result of measuring the vapor pressure in Example 1 and Comparative Example 1.

FIG. 4 is a graph for showing the result of measuring the vapor pressure in Example 2 and Comparative Example 1.

DESCRIPTION OF THE INVENTION

Figure 5:
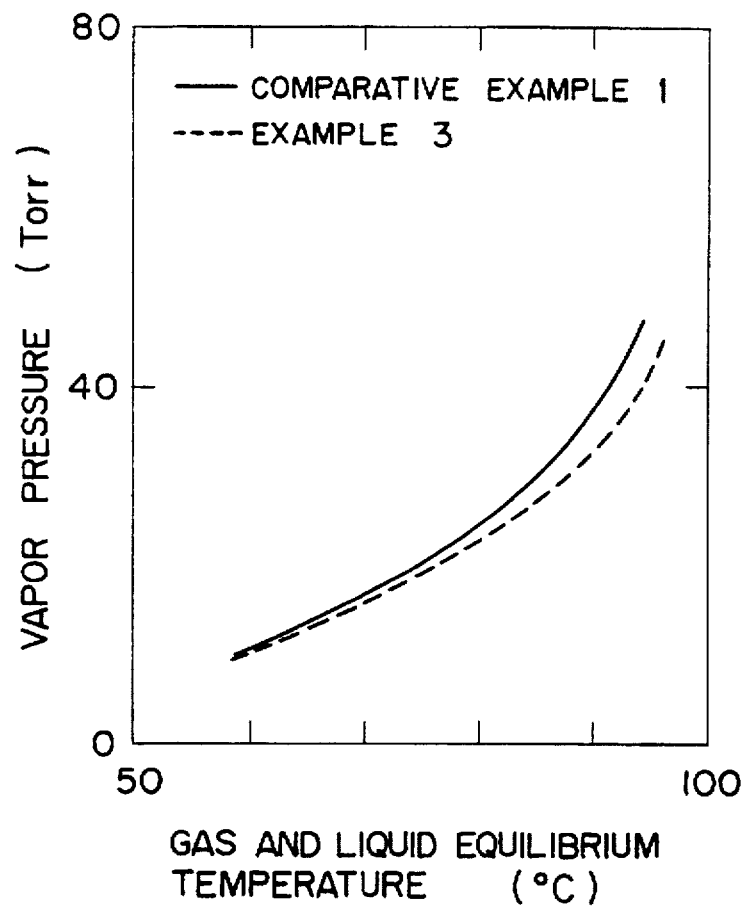
FIG. 5 is a graph for showing the result of measuring the vapor pressure in Example 3 and Comparative Example 1.

In an absorbent solution wherein triethylene glycol or tetraethylene glycol is added, because they are an organic compound, there is a problem that stability in a regenerator and so on which becomes of high temperature, generation of low boiling point gas due to decomposition and so on are anxious.

In actual absorption refrigerators, in addition to the compositions shown in Literatures 1 and 2, it is well known to add an alkali component as a corrosion inhibitor. Without this alkali addition, generation of incondensable gas such as hydrogen is inevitable in the interior, actually unabling to operate. When CaCl$_2$ is added to an alkaline absorbent solution, however, solubility of CaCl$_2$ is significantly depressed by the following chemical reaction and the absorbent solution shown in the Literatures 1 and 2 becomes absent.

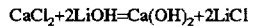

$$CaCl_2 + 2LiOH = Ca(OH)_2 + 2LiCl$$

That is, the mixed solution shown in Literatures 1 and 2 cannot be substantially used as an absorbent solution for an absorption cool- and hot-water apparatus.

We have studied hard about an addition effect when an alkali component such as LiOH coexists and as a result, found proper additives.

Thus, we have found that at least one of cesium halides is added to an alkaline absorbent solution having LiBr and water as a main component thereby enabling a crystallization temperature of the absorbent solution to depress without depressing the vapor absorption ability.

In view of the above-mentioned points, the present invention is achieved on the basis of the above-mentioned findings. The object of the present invention is to depress a temperature of crystallization of an absorbent solution without depressing the vapor absorption ability of the absorbent solution for an absorption refrigerator whereby a small scaled apparatus such as in business use or domestic use can be practically used and thereby preventing malfunction due to crystallization of the absorbent solution in load fluctuation during operation or at the time of emergency service interruption.

To achieve the above-mentioned object, the absorbent solution for absorption refrigerator of the present invention is constituted so as to comprise at least one member of cesium halides added to an alkaline absorbent solution having lithium bromide and water as a main component. At least one of calcium halides can be added thereto.

As cesium halides, at least one of compounds selected from the group of cesium bromide, cesium chloride, cesium iodide and cesium fluoride is used. As calcium halides, at least one of compounds selected from the group of calcium bromide, calcium chloride and calcium iodide is used.

Of these compounds, cesium chloride is preferably used as cesium halides. And, calcium chloride is preferably used as calcium halides. Further, in the case of combining both, it is preferable that cesium chloride is used as cesium halides and calcium chloride is used as calcium halides.

An amount of at least one compound of cesium halides and calcium halides is 0.01 to 15% by weight, preferably 0.05 to 13% by weight, more preferably 2.5 to 12% by weight.

To the above-mentioned absorbent solution for absorption refrigerator is generally added lithium hyroxide (LiOH) in an amount of 0.3–3.0% as a corrosion inhibitor. Further, as above-mentioned, LiBr is generally used in an amount of 60–65% by weight. A pH of this alkaline solution is in the range of 12 to 14.

FIG. 1 shows a relationship between an amount of CsCl and vapor pressure and a relationship between the amount of CsCl and a crystallization temperature depression, when cesium chloride (CsCl) is added as a crystallization preventing agent to an aqueous solution having LiBr of 64% by weight. When the amount of CsCl added is less than the above range, it can be seen from FIG. 1 that the crystallization temperature depression of the absorbent solution is not substantially influenced and an advantage of addition cannot be recognized. On the other hand, when exceeding the above-mentioned range, the vapor pressure of the absorbent solution is elevated and thus the vapor absorption ability of the absorbent solution is depressed.

FIG. 2 shows a relationship between an amount of calcium chloride ($CaCl_2$) added and vapor pressure and a relationship between the amount of $CaCl_2$ added and a crystallization temperature depression when calcium chloride ($CaCl_2$) is added as a crystallization preventing agent to an aqueous solution having LiBr of 64% by weight. From FIG. 2 it is understood that an amount of $CaCl_2$ added is substantially equal to that in CsCl.

Referring to FIGS. 1 and 2, 0 in the abscissas thereof shows 64 wt % LiBr aqueous solution (base liquid). Further, "10" and "20" in the abscissas thereof show that $CsCl/CaCl_2$ is added to each base liquid on the weight thereof. For example, "10" in the axis of abscissas is a solution of (LiBr:64 g+water:36 g+CsCl:10 g) and in this case, LiBr=64/(64+36+10)=58.2 wt %

CsCl=10/(64+36+10)=9.1 wt %, and total salt concentration=(64+10)/(64+36+10)=67.3 wt %

The left axis of ordinates in FIGS. 1 and 2 shows the vapor pressure of the solution at 70° C. The right axis of ordinates thereof shows crystallization temperature depression. A crystallization temperature of a solution exhibiting the same vapor pressure at the time of addition and at the time without addition is compared and a difference thereof is shown as said depression. For example, in "10" of the axis of abscissas of FIG. 1, crystallization temperature depression of 55−26=29° C. is shown as a difference between a crystallization temperature (about 26° C.) of CsCl-added solution (total salt concentration of 67.3 wt %) and a crystallization temperature (about 55° C.) of LiBr solution (about 66 wt %) having the same vapor pressure as that of the CsCl-added solution at 70° C.

EXAMPLES

Hereinunder, the present invention is further illustrated in detail on the basis of Examples. It is, however, to be understood that the present invention is not limited to these Examples.

Comparative Example 1

An aqueous solution containing 64% by weight of LiBr was prepared. The crystallization temperature and vapor pressure were measured without adding additives to this aqueous solution and this temperature was used as a standard value (0° C.) in crystallization temperature depression. The results obtained are shown in Table 1.

TABLE 1

| | Concentration of LiBr (wt %) | Additives (wt %) | | Crystallization temperature (°C.) | Crystallization temperature depression (°C.) |
|---|---|---|---|---|---|
| | | $CaCl_2$ | CsCl | | |
| Example 1 | 64 | 10 | — | 33.0 | 15.0 |
| Example 2 | " | — | 10 | 26.0 | 29.0 |
| Example 3 | " | 5 | 5 | 24.0 | 31.0 |
| Example 4 | " | 2 | 8 | 31.0 | 17.0 |
| Comparative Example 1 | " | — | — | 37.5 | — |

Examples 1 to 4

Figure 6:
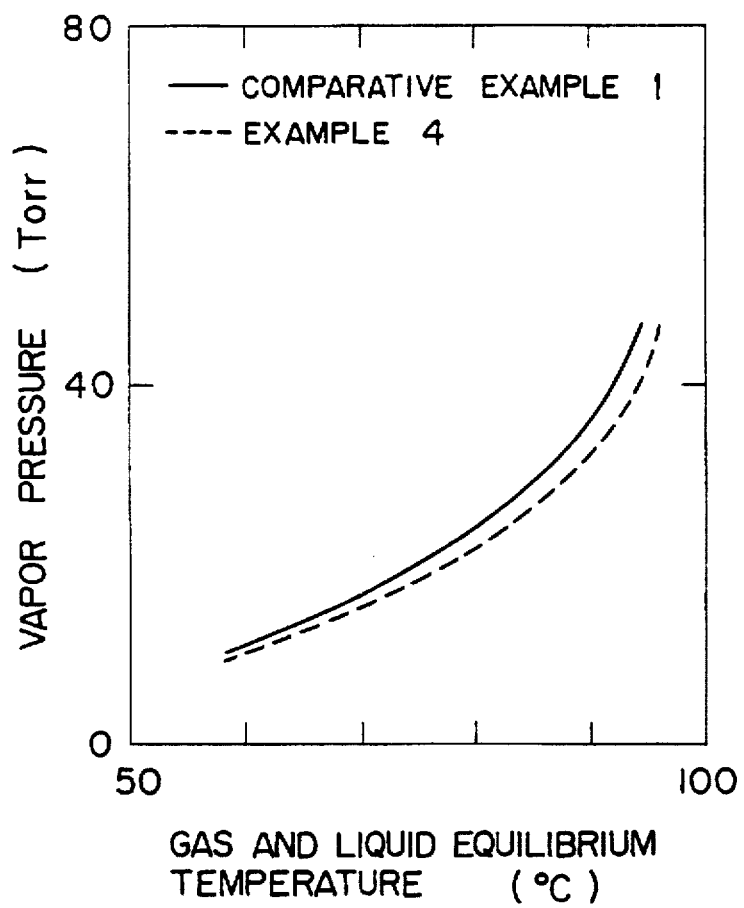
FIG. 6 is a graph for showing the result of measuring the vapor pressure in Example 4 and Comparative Example 1.

An aqueous alkaline solution containing 64% by weight of LiBr was prepared. To the aqueous solution was added a calcium halide and/or a cesium halide, as shown in Table 1, in the concentration shown in Table 1, to prepare the sample absorbent solutions of Examples 1 to 4. A crystallization temperature and a vapor pressure of each of sample absorbent solutions were measured. The results thus obtained are shown in Table 1. The results of the vapor pressure measurement of Examples 1 to 4 and Comparative Example 1 are shown in FIGS. 3 to 6. Crystallization temperature depression was obtained in view of the same temperature and the same vapor pressure. FIGS. 3 to 6 illustrate vapor pressure data of Comparative Example and Examples (Table 1). Because any of total salt concentrations of Examples is higher than that of Comparative Example, these figures show an ability at a level equivalent to the conventional liquid (LiBr).

From Table 1 it is clear that an absorbent solution in which at least one member of calcium halides and cesium halides is added to an absorbent solution having LiBr and water as a main component does not depress vapor absorption ability, that is, does not elevate the vapor pressure of the absorbent solution but depresses crystallization temperature thereof.

Advantage of the Invention

The present invention is constituted as above and therefore achieves the following advantages.

To an absorbent solution having LiBr and water as a main component is added at least one member of cesium halides and calcium halides as a crystallization inhibitor whereby crystallization temperature can be lowered without depressing vapor absorption ability of the absorbent solution. Therefore, a small scaled apparatus such as business use or domestic use can be practically used and further, malfunction due to crystallization of an absorbent solution at the time of load fluctuation in operation or at the time of emergency stop can be prevented.

What is claimed is:

1. An absorbent for an absorption refrigeration system, said absorbent composition comprising 0.01–12 parts by weight cesium chloride in 100 parts by weight of an absorbent solution, said absorbent solution, said absorbent solution comprising water and 60–65 wt. % lithium bromide.

2. The absorbent composition according to claim 1, wherein said absorbent composition comprises 005–12 parts by weight cesium chloride in 100 parts by weight of said absorbent solution.

3. The absorbent composition according to claim 1, wherein said absorbent composition comprises 2.25–12 parts by weight cesium chloride in 100 parts by weight of said absorbent solution.

4. The absorbent composition according to claim 1, wherein pH thereof is in the range of 12 to 14.

5. The absorbent composition according to claim 1, wherein said absorbent solution comprises 64 wt. % lithium bromide.

6. The absorbent composition according to claim 2, wherein said absorbent solution comprises 64 wt. % lithium bromide.

7. The absorbent composition according to claim 3, wherein said absorbent solution comprises 64 wt. % lithium bromide.

* * * * *